United States Patent [19]
Aoyama

[11] Patent Number: 5,398,292
[45] Date of Patent: Mar. 14, 1995

[54] EDGE DETECTING APPARATUS

[75] Inventor: Chiaki Aoyama, Wako, Japan

[73] Assignee: Honda Giken Kogyo Kabushiki Kaisha, Tokyo, Japan

[21] Appl. No.: 49,524

[22] Filed: Apr. 20, 1993

[30] Foreign Application Priority Data

Apr. 22, 1992 [JP] Japan .................. 4-103244

[51] Int. Cl.$^6$ .............. G06K 9/48; G06K 9/56; G06K 9/68
[52] U.S. Cl. ............... 382/22; 382/27; 382/34
[58] Field of Search ............ 382/22, 21, 24, 27, 382/33, 48, 60, 34

[56] References Cited

U.S. PATENT DOCUMENTS

| | | | |
|---|---|---|---|
| 4,547,895 | 10/1985 | Mita et al. | 382/8 |
| 4,803,736 | 2/1989 | Grossberg et al. | 382/22 |
| 4,868,752 | 9/1989 | Fujii et al. | 364/424.02 |
| 4,896,364 | 1/1990 | Lohscheller | 382/22 |
| 4,970,653 | 11/1990 | Kenue | 364/461 |
| 5,019,903 | 5/1991 | Dougall | 358/140 |
| 5,144,684 | 9/1992 | Inada et al. | 382/22 |
| 5,212,740 | 5/1993 | Paek et al. | 382/22 |

OTHER PUBLICATIONS

Gonzalez et al., *Digital Image Processing*, Addison-Wesley (1992), pp. 5 414–416.
Publication "Linear Feature Extraction and Description," Authors Nevatia and Babu (1979), Computer Graphics and Image Processing, 13, pp. 257–269.
"Digital Picture Processing", Azriel Rosenfeld, Avnash C. Kak, Academic Press (1976), certain pages provided for PTO (Contents, Preface, Acknowledgements, pp. 296-297).

*Primary Examiner*—Leo H. Boudreau
*Assistant Examiner*—Michael R. Cammarata
*Attorney, Agent, or Firm*—Lyon & Lyon

[57] ABSTRACT

Edge detecting masks each having a sensing directivity to a specific direction are arranged with each directivity direction shifted by a given angular interval from the neighboring masks. A sum-of-products computation is performed between weighting elements in each of the so-arranged masks and image data indicating the brightness or tint of respective pixels. A selecting device selects a mask which exhibits the maximum sum-of-products output value among others and also selects two or three more masks before and behind the selected mask according to the interpolation method employed. An estimate computing device performs interpolation using the angles and output values of the selected edge detecting masks to estimate a true edge direction.

5 Claims, 8 Drawing Sheets

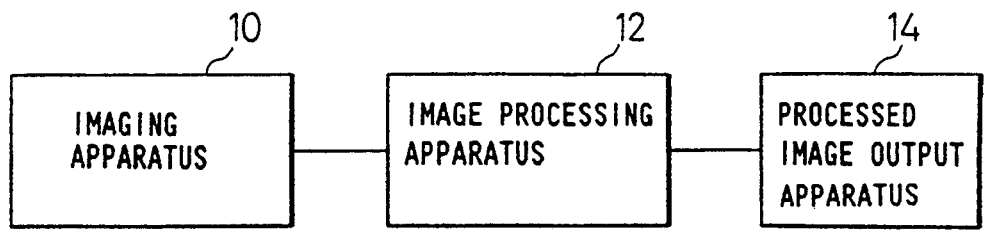
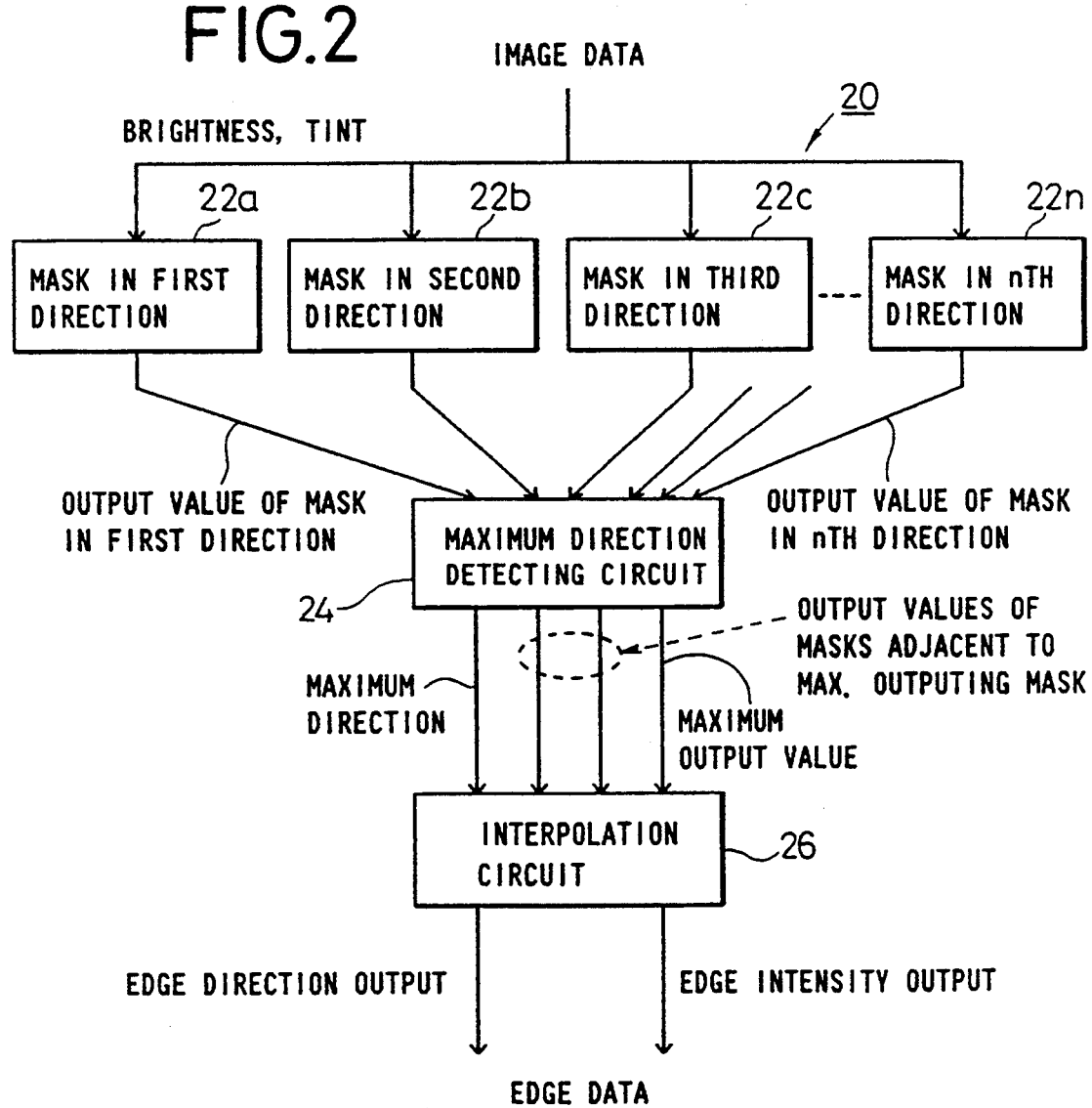

| 1 | 1 | 1 | 1 | 1 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| -1 | -1 | -1 | -1 | -1 | -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 | -1 | -1 | -1 | -1 | -1 |

M

| -1 | 0 | 1 |
|---|---|---|
| -2 | 0 | 2 |
| -1 | 0 | 1 |

$M_H$

| -1 | -2 | -1 |
|---|---|---|
| 0 | 0 | 0 |
| 1 | 2 | 1 |

$M_V$

← LATERAL-STRIPED PATTERN

← PROPER LINE SEGMENT CANDIDATE

IMPROPER LINE SEGMENT CANDIDATES

EDGE DETECTING APPARATUS

BACKGROUND OF THE INVENTION

1. Field of the Invention

This invention relates to an apparatus for detecting an edge appearing in a picture, and more specifically to an edge detecting apparatus for detecting a white line on a road based on the image information of the road surface in order to implement automatic driving of a vehicle.

2. Description of the Related Art

Guiding information is necessary when a vehicle is automatically driven along a road. For this purpose, a white line on the road is an important information source. The vehicle can be automatically driven along the road with the guidance given by the white line, unless the white line has not been discontinued due to construction work or the like.

To this end, the road surface marked with a white line is first photographed with a video camera. Then, the white line may be recognized on the video screen by detecting an edge, that is, a sudden difference in the brightness or tint across the border of the normal road surface and white line.

Methods of recognizing an edge in an image remain a field which is rapidly developing as a part of an image analysis and processing technique applied to images from a satellite, etc. In this field, a variety of methods have been developed up to date (See, for example, A. Rosenfeld and A. Kak, "Digital Picture Processing", Academic Press, 1976).

Among the methods referred to above, there is known one called a SOBEL's operator. This is used to determine a primary differential value (gradient) indicative of variations in X- or Y-direction in the brightness or tint of a picture.

FIG. 11 shows a pair of SOBEL's operators. The operators are respectively of a mask $M_H$ for determining a gradient in a horizontal (X) direction and a mask $M_V$ for determining a gradient in a vertical (Y) direction. Each operator is provided with weighting elements in a $3 \times 3$ matrix. The intensity of the gradient in the horizontal or vertical direction is determined by performing a sum-of-products operation between respective weighting elements in each mask and the signal intensity J of pixels at corresponding positions of respective weighting elements in the mask. Then, the angle of a gradient vector with respect to the X-axis can be determined as follows:

$$\text{Angle} = \tan^{-1}(J \times M_V / J \times M_H) \quad (1)$$

The direction of an edge is normal to the direction of the so-determined gradient vector. However, this method is highly susceptible to noise because each mask is only $3 \times 3$ in size.

There is also known a template method. According to this method, a plurality of gradient detecting masks called templates, each having sensing directivity in a specific direction fixed to each, are provided. The sum-of-products operation with an image is performed on each template. Then, the direction in which a certain template has produced the maximum output among others is selected to be the direction of the gradient vector and the output value obtained by that template is taken as the intensity of the gradient vector. Similar template methods have also been proposed by ROBINSON, PREWITT, KIRSCH (See G. S. Robinson, "Edge Detection by Compass Gradient Masks", CGIP, Vol. 6, pp. 492-501 (1977); J. M. S. Prewitt, "Object Enhancement and Extraction," in *Picture Processing and Psychopictories*, B. S. Lipkin and A. Rosenfeld (eds.), Academic Press, New York, 1970; and R. A. Kirsch, "Computer Determination of the Constituent Structure of Biological Images," *Computers and Biomedical Research*, Vol. 4, No. 3, pp. 315-328 (June 1979)).

An improvement over a simple operator in susceptibility to noise has been attained in the template methods referred to above due to the use of a plurality of templates each having the sensing directivity, however, these methods still have drawbacks that they tend to undergo the influence of noise as they employ $3 \times 3$ type templates.

There has also been proposed a method of detecting an edge in which a signal indicative of the brightness or tint of the original image is blurred by a GAUSSIAN function, and then, a secondary differential of the blurred image is calculated by $\nabla^2 G$ (where $\nabla^2$ represents a Laplacian operator and G represents a GAUSSIAN function). This method attains an improvement in the susceptibility to noise but has a problem of a poor ability of detecting edges arranged at narrow intervals because each mask is big in size.

A HOUGH conversion method is generally used to determine a straight line from signals indicative of edges, which have been detected by use of the various techniques referred to above.

First of all, pixels arranged on a candidate straight line representative of the edge are extracted from the original image by use of the edge detecting operators. Then, each of pixels is given a set of coordinates $(x_i, y_i)$ in an x-y plane, and all the loci $\rho = x_i \cos \alpha + y_i \sin \alpha$ each corresponding to each set of the coordinates $(x_i, y_i)$ are counted up in a $\rho$-$\alpha$ plane, where $\rho$ is the length of a perpendicular from the origin to the candidate straight line, and $\alpha$ is an angle between the perpendicular and X-axis. If a straight line represented by $\rho_0 = x\cos\alpha_0 + y\sin\alpha_0$ exists in the given image, then all the loci in the $\rho$-$\alpha$ plane representing the pixels on the straight line are duplicated at a point $(\rho_0, \alpha_0)$ and a peak count should occur at that point. Thus, by detecting that peak count, the straight line representative of the edge can be determined.

Any straight line can be detected by the HOUGH conversion method in principle, even if the straight line is discontinued. However, in order for this method to work satisfactorily, the straight line should be sufficiently long and located sufficiently distant from others. In a case where a number of straight lines are arranged in parallel adjacent to each other at narrow intervals, this method tends to bring about erroneous or fake candidates, as illustrated in FIG. 12.

SUMMARY OF THE INVENTION

With the foregoing problems in view, it is an object of the present invention to provide an edge detecting apparatus capable of determining the direction of each edge with high accuracy without being affected by noise.

In order to achieve the above object, there is provided an edge detecting apparatus which comprises edge detecting means comprising a plurality of edge detecting masks, each having a sensing directivity to a specific direction fixed to each and arranged with each directivity direction shifted by a given angular interval from the neighboring masks; edge output selecting means for selecting an edge detecting mask exhibiting the maximum output among other edge detecting masks of said edge detecting means and selecting a predetermined number of edge detecting masks disposed before and behind said selected edge detecting mask from said edge detecting means; and edge direction estimating means for estimating a true direction of the edge on the basis of angles at which the respective edge detecting masks selected by said edge output selecting means are directed and the output values of said selected respective edge detecting masks.

The respective edge detecting masks can be arranged so as to be shifted by an angular interval which falls within a $\tan^{-1}$(width/length) determined based on the aspect ratio of each mask. Each edge detecting mask is provided with weighting elements arranged in a rectangular matrix. A sum-of-products operation is performed between respective weighting elements in each mask and image data indicative of the brightness or tint of respective pixels at corresponding positions of the weighting elements.

The edge output selecting means selects the edge detecting mask which exhibits the maximum sum-of-products value among others. Further, the edge output selecting means can also select two or three more edge detecting masks other than the already selected edge detecting mask. The edge direction estimating means performs an interpolation calculation using angles at which the selected edge detecting masks are directed and the sum-of-products output values of the selected respective masks to thereby estimate a true edge direction.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 1 is a block diagram showing an image processing apparatus according to the present invention;

FIG. 2 is a block diagram illustrating an edge detecting apparatus according to the present invention;

DETAILED DESCRIPTION OF THE PREFERRED EMBODIMENTS

Figures 3, 4:
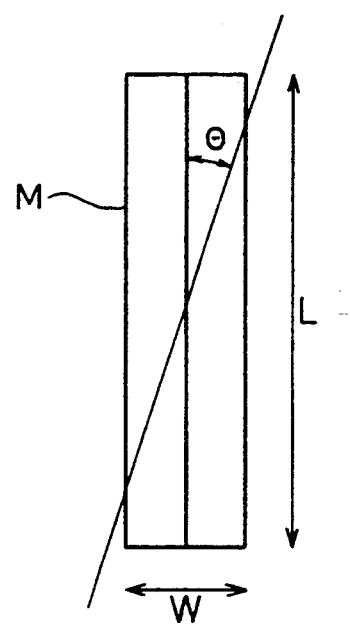
FIG. 3 is a view for describing an edge detecting mask according to the present invention.
FIG. 4 is a view for explaining an angle between the edge detecting mask and the edge.

An image processing apparatus according to the present invention will hereinafter be described with reference to the accompanying drawings.

FIG. 1 is a block diagram showing one example of the structure of an image processing apparatus according to the present invention.

Referring to FIG. 1, an image signal indicative of an object is obtained by an imaging apparatus 10. The signal is processed by the image processing apparatus 12, where information about a white line drawn on a road is detected. The detected information is outputted from a processed image output apparatus 14. An object of the present invention is to propose an edge detecting apparatus 20 to be employed in the image processing apparatus 12. FIG. 2 shows the structure of the edge detecting apparatus 20.

The edge detecting apparatus 20 comprises n edge detecting masks 22a through 22n, a maximum direction detecting circuit 24 and an interpolation circuit 26.

Now, a rectangular mask M is shown in FIG. 3, which is one of the n edge detecting masks 22a through 22n. In the mask M, weighting elements $-1, -1, 0, 1, 1$ are arranged in a W×L rectangular matrix, and a sum-of-products operation is performed between these weighting elements and image data indicative of the brightness or tint of respective pixels at corresponding positions of the respective weighting elements. With a rectangular mask M whose size is 5×21, susceptibility to noise is improved by about 11 dB as compared with the SOBEL's 3×3 operator.

Figure 5:
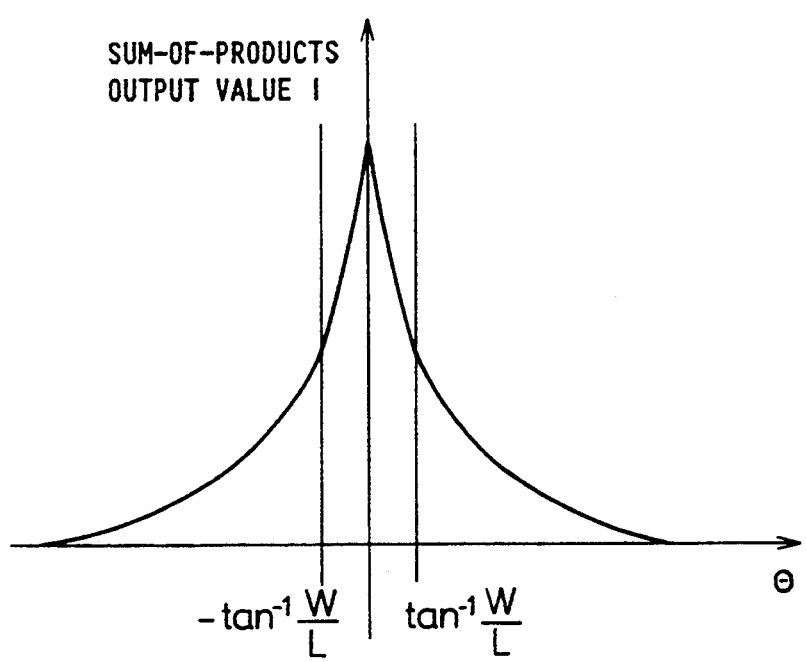
FIG. 5 is a view for describing the relationship between the angle with respect to an edge detecting mask and the intensity of an output from the edge detecting mask.

The mask M attains the maximum sum-of-products value when the edge to be detected is placed at the center of the mask along its longitudinal direction. Thus, the mask M exhibits a sharp sensing directivity in the longitudinal direction thereof. When the edge to be detected is placed aslant at the center of the mask with an angle Θ as shown in FIG. 4, the sum-of-products value (hereinafter called an "intensity" or simply "I") decreases from its maximum as the angle Θ increases, as shown in FIG. 5.

Assuming that Θ does not exceed a value calculated by $\tan^{-1}$(W/L), where W is the width of, and L is the length of the mask M, the intensity I is given by the following equation:

$$I=(L/2)\{W-(L/2) \tan \Theta\} \qquad (2)$$

For W=5, L=21, for example, $\tan^{-1}$(W/L)=13.4°, and for a Θ smaller than 13.4°, the equation (2) is rewritten as follows (With an error of less than 1%, for Θ=10°):

$$I=(L/2) \{W-(L/2)\Theta\} \qquad (3)$$

If Θ becomes greater than the $\tan^{-1}$(W/L), the intensity I is given by the following equation:

$$I=(W^2/4) \tan (\pi/2-\Theta) \qquad (4)$$

In the present invention, the n edge detecting masks 22a through 22n, each being identical to the mask M shown in FIG. 3, are arranged with respective longitudinal directions shifted by a given angular interval from the neighboring ones. The angle at which i-th mask is placed with respect to a reference direction (e.g. Y-axis) is called a "mask direction" and denoted by $\theta_i$. A mask at its mask direction $\theta_i$ is also called a "mask $\theta_i$". Then, each mask disposed in this manner and image data are subjected to the sum-of-products operation to find which mask outputs the maximum intensity among others.

The true direction of the edge is then obtained by an interpolation calculation with reference to the mask directions and intensities of masks disposed before and behind the mask which is outputting the maximum intensity.

Figure 6:
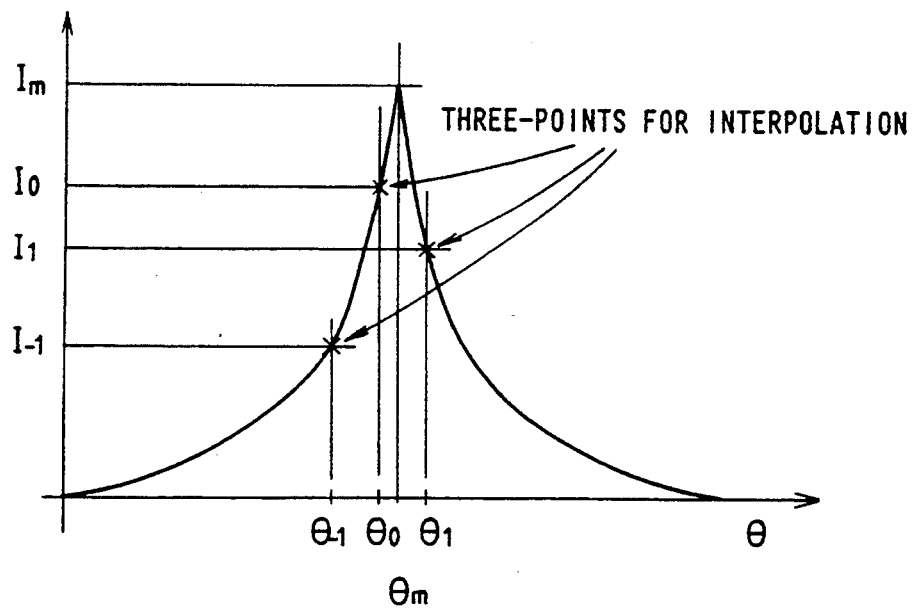
FIG. 6 is an explanatory view of selecting edge detecting masks whose angles and output values are used for interpolation.

Now, assume as an embodiment of the invention that three masks are placed in respective mask directions $\theta_{-1}$, $\theta_0$ and $\theta_1$ and an edge exists in the direction between $\theta_0$ and $\theta_1$, and that the output intensities of respective masks are represented by $I_{-1}$, $I_0$ and $I_1$ as shown in FIG. 6. The maximum direction detecting circuit 24 shown in FIG. 2 compares the respective output intensities of the n edge detecting masks 22a through 22n, and in this particular case of FIG. 6, finds that the mask $\theta_0$ is outputting the intensity $I_0$ which is the maximum among others. The maximum direction detecting circuit 24 further examines the intensities $I_{-1}$ and $I_1$ of masks which lie next to the mask $\theta_0$ referred to above.

Next, $\theta_{-1}$, $\theta_0$ and $\theta_1$ with $I_{-1}$, $I_0$ and $I_1$ are transmitted to the interpolation circuit 26 shown in FIG. 2. The interpolation circuit 26 determines a direction $\theta_m$ for estimating a peak output $I_m$ in accordance with formula (5) or (7), and decides a coefficient a employed in the interpolation formulas in accordance with formula (6) or (8). Incidentally, the maximum output intensity $I_0$ in this case and the peak output $I_m$ obtained as a result of the interpolation calculation are normally different from each other.

When $I_{-1}$ is smaller than $I_1$, the following equations are first established:

$$\theta_m = \theta_0 + (I_1 - I_{-1})(\theta_1 - \theta_0)/\{2(I_0 - I_{-1})\} \quad (5)$$

$$a = (I_0 - I_{-1})/(\theta_0 - \theta_1) \quad (6)$$

When $I_{-1}$ is larger than $I_1$, the following equations are obtained:

$$\theta_m = \theta_0 - (I_{-1} - I_1)(\theta_0 - \theta_{-1})/\{2(I_0 - I_1)\} \quad (7)$$

$$a = (I_1 - I_0)/(\theta_1 - \theta_0) \quad (8)$$

The peak output $I_m$ is given as follows:

$$I_m = a(\theta_m - \theta_0) + I_0 \quad (9)$$

Figure 7:
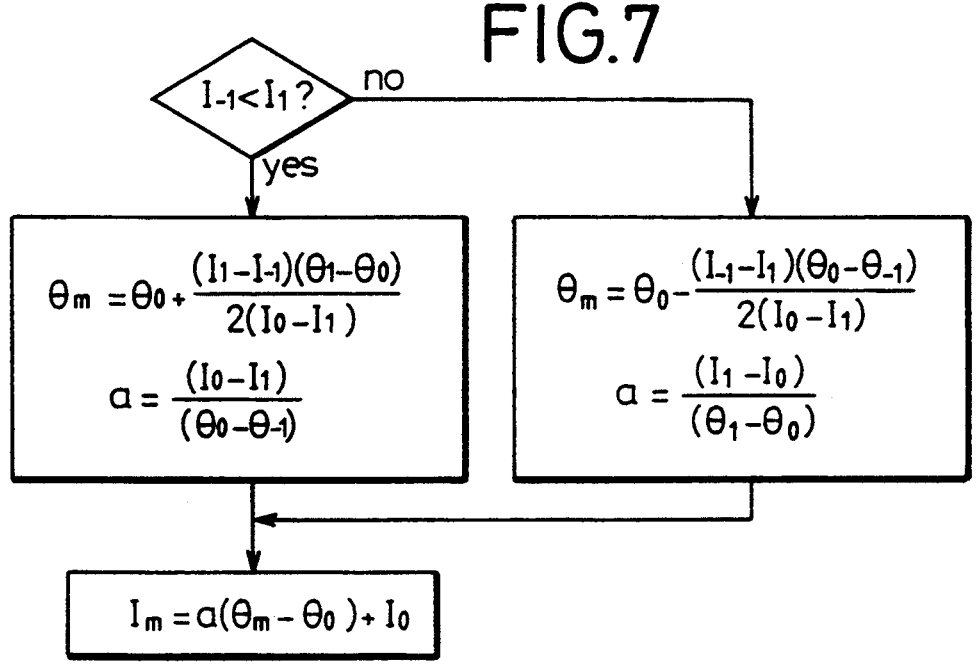
FIG. 7 is a block diagram describing an interpolation procedure for estimating the true direction of the edge.

These procedures are illustrated in FIG. 7.

Figure 8:
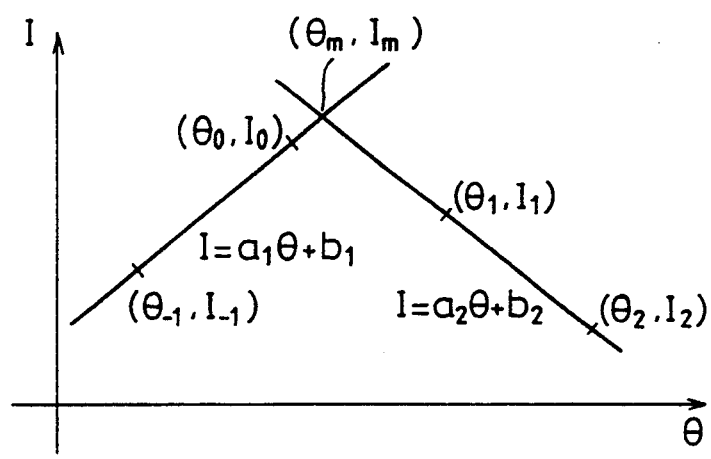
FIG. 8 is a view illustrating a four-point interpolation method based on a cross-point where two straight line segments intersect.

There can be various alternative interpolating methods other than that described above. Hereinafter a four-point interpolation method as another embodiment will be described, which makes use of a cross point of two straight line segments on a $\theta$-I space, as shown in FIG. 8.

Here is assumed a linearly decreasing characteristic in the output before and after the peak output value of a mask with respect to the existence angle of the edge, which is the same as that shown in FIG. 5 or 6.

Assume that the intensities of sum-of-products in the masks $\theta_{-1}$, $\theta_0$, $\theta_1$ and $\theta_2$ are respectively given by $I_{-1}$, $I_0$, $I_1$, and $I_2$ among the n masks lying in the respective directions, and that the mask $\theta_0$ exhibits the maximum intensity of all. Two straight line segments can be drawn in a $\theta$-I plane, one of which is a first straight line segment defined by connecting two points $(\theta_{-1}, I_{-1})$ and $(\theta_0, I_0)$ and the other is a second one defined by connecting other two points $(\theta_1, I_1)$ and $(\theta_2, I_2)$. Then, a direction $\theta_m$ in which a peak value of output is attained and the peak output value $I_m$ at $\theta_m$ are given as a cross point $(\theta_m, I_m)$ of the above-stated two straight line segments.

The equations for the first straight line segment defined by connecting the two points $(\theta_{-1}, I_{-1})$ and $(\theta_0, I_0)$ and for the second straight line segment defined by joining the two points $(\theta_1, I_1)$ and $(\theta_2, I_2)$ are respectively given as follows:

$$I = a_1\theta + b_1 \quad (12)$$
where,
$a_1 = (I_{-1} - I_0)/(\theta_{-1} - \theta_0)$,
$b_1 = I_0 - a_1\theta_0$ $$I = a_2\theta + b_2 \quad (13)$$
where,
$a_2 = (I_1 - I_2)/(\theta_1 - \theta_2)$,
$b_2 = I_1 - a_2\theta_1$ then, the point $(\theta_m, I_m)$ where the two straight line segments intersect is given by the following equations:

$$\theta_m = (b_1 - b_2)/(a_2 - a_1) \quad (14)$$

$$I_m = (a_2 b_1 - a_1 b_2)/(a_2 - a_1) \quad (15)$$

The principle on which the edge detecting apparatus according to the present invention works and the respective methods for effecting the interpolation calculations have been described.

Figure 9:
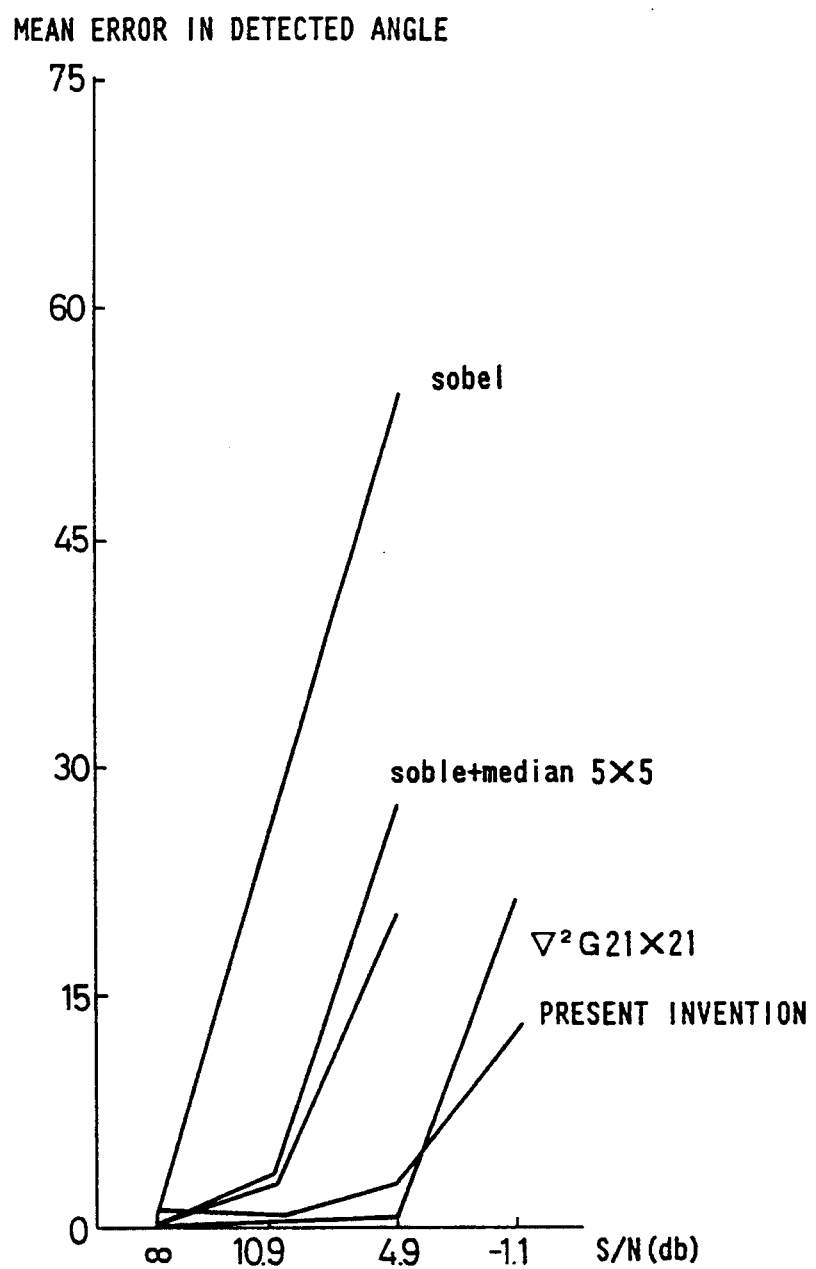
FIG. 9 is a view comparing the mean errors in the edge angle detected by various methods.
Figures 11, 12:
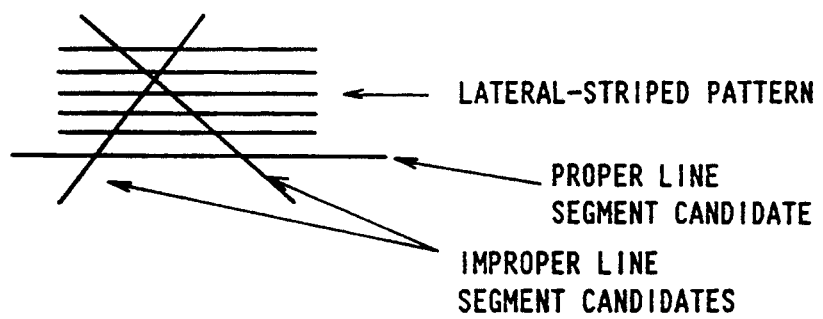
FIG. 11 is a view illustrating a pair of SOBEL's operators.
FIG. 12 is a view showing improper line segment candidates selected in the HOUGH conversion method.

FIG. 9 shows the mean error in the edge angles, which have been detected in accordance with the SOBEL, $\nabla^2 G$ and the present invention (first embodiment), respectively. Edges added with noise are processed in accordance with the respective methods, and the mean differences for the respective methods between the true edge angles and the detected angles are shown. It is understood from FIG. 11 that the mean error according to the present invention is kept small even in a low S/N ratio environment.

Figure 10:
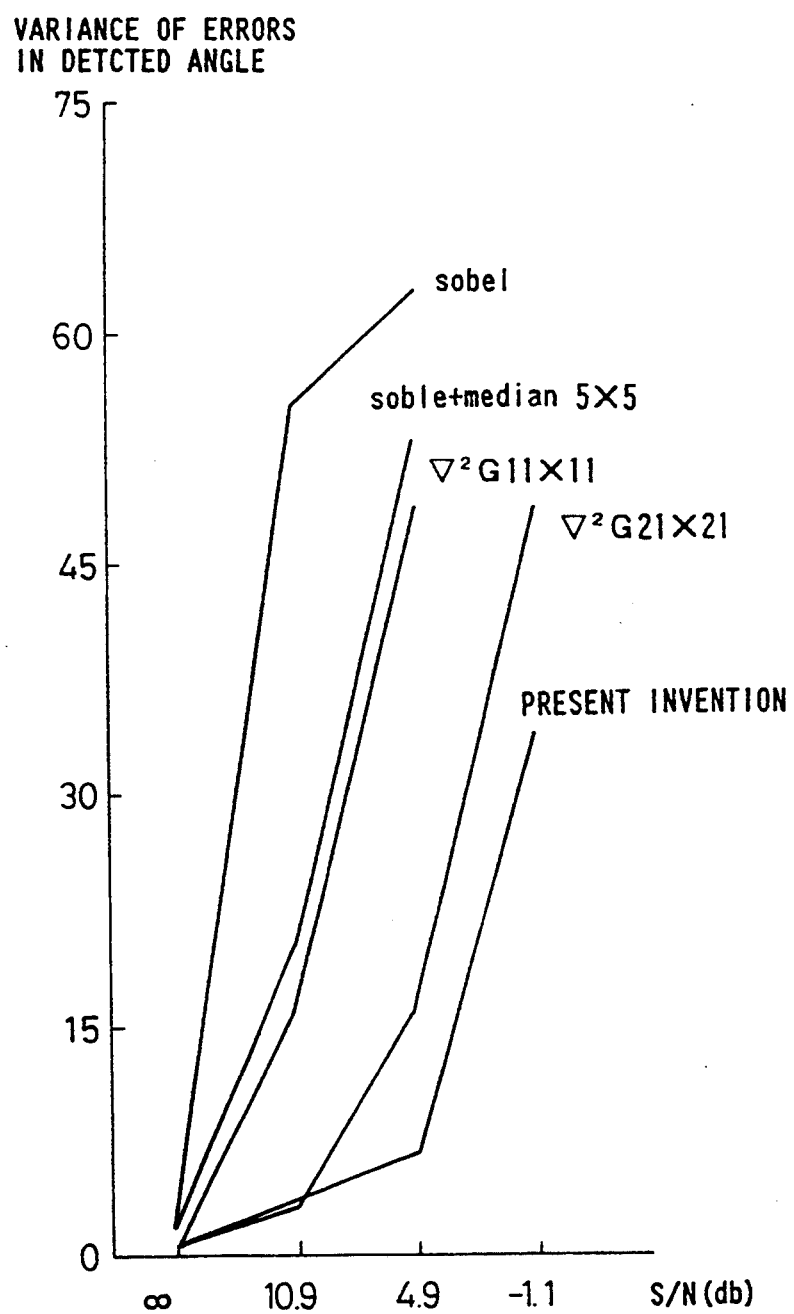
FIG. 10 is a view comparing the variances of errors in the edge angle detected by various methods.

FIG. 10 illustrates the variance of errors in the edge angles which have been detected in accordance with SOBEL, $\nabla^2 G$ and the present invention (first embodiment), respectively. It is understood from FIG. 10 that the variance of errors according to the present invention is kept small even in a low S/N ratio environment.

According to the present invention, as has been described above, rectangular masks each having the sharp sensing directivity to edges extending in a specific direction are combined together. The results of outputs of the masks are then interpolated to thereby determine a true edge direction. The edge detecting apparatus is therefore hard to undergo the influence of noise. Further, the angle of each edge can be determined with high accuracy.

Having now fully described the invention, it will be apparent to those skilled in the art that many changes and modification can be made without departing from the spirit or scope of the invention as set forth herein.

What is claimed is:

1. An edge detecting apparatus comprising:

video camera means for generating an image of a road surface, said image including at least one boundary of said road surface;

means for converting said image into image data comprising an array of image pixels;

edge detecting means for detecting a position of an edge of said boundary of said road surface, said edge detecting means comprising a plurality of edge detecting masks, each of said edge detecting masks comprising an identical matrix of weighting coefficients, said edge detecting masks being imposed over said array of image pixels at differing angular orientations with respect to said array of image pixels, wherein the angular orientation of each edge detecting mask is shifted by a given angular interval from another said edge detecting mask, and calculating means for performing a sum-of-products operation between respective weighting coefficients in each edge detecting mask and a signal intensity of said image pixels located at corresponding positions of said respective weighting coefficients, and producing respective output values for each of said edge detecting masks;

edge output selecting means for selecting an edge detecting mask exhibiting a maximum output value from among said edge detecting masks and selecting a predetermined number of edge detecting masks disposed before and behind the edge detecting mask exhibiting the maximum output value; and interpolating circuit means for estimating by interpolation a true direction of the edge on the basis of angles at which the respective edge detecting masks selected by said edge output selecting means are disposed with respect to said array of image pixels and by the output values of the selected respective edge detecting masks.

2. An edge detecting apparatus according to claim 1, wherein said angular interval is less than or equal to $\tan^{-1} w/l$, where w is a width and l is a length of said edge detecting masks.

3. An edge detecting apparatus according to claim 1, wherein said predetermined number of edge detecting masks is two, and two edge detecting masks disposed adjacent to the edge detecting mask exhibiting the maximum output value among other edge detecting masks are selected.

4. An edge detecting apparatus according to claim 1, wherein said predetermined number of edge detecting masks is three, and two edge detecting masks adjacent to the edge detecting mask exhibiting the maximum output value among the other edge detecting masks are selected, and further, one edge detecting mask adjacent to the edge detecting mask exhibiting a bigger output value of the above-selected two edge detecting masks is selected.

5. The edge detecting apparatus of claim 1, wherein said boundary of said road surface comprises a line on said road surface.

* * * * *